UNITED STATES PATENT OFFICE.

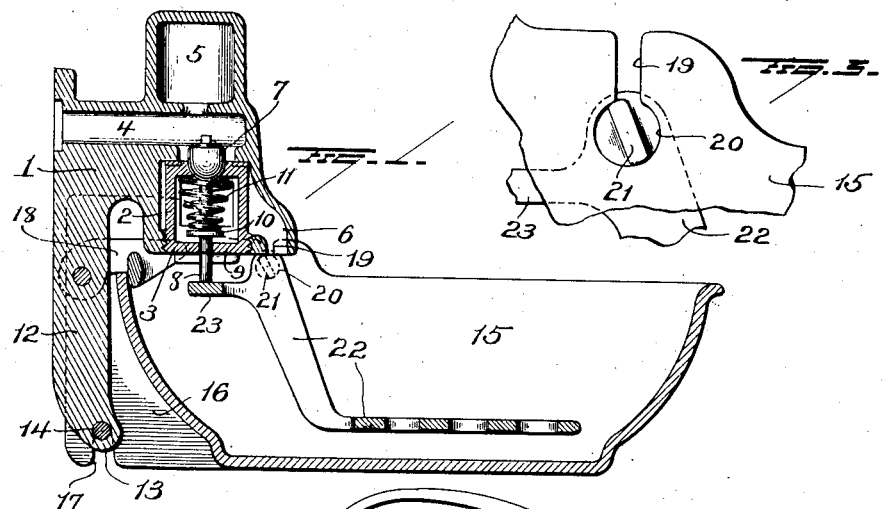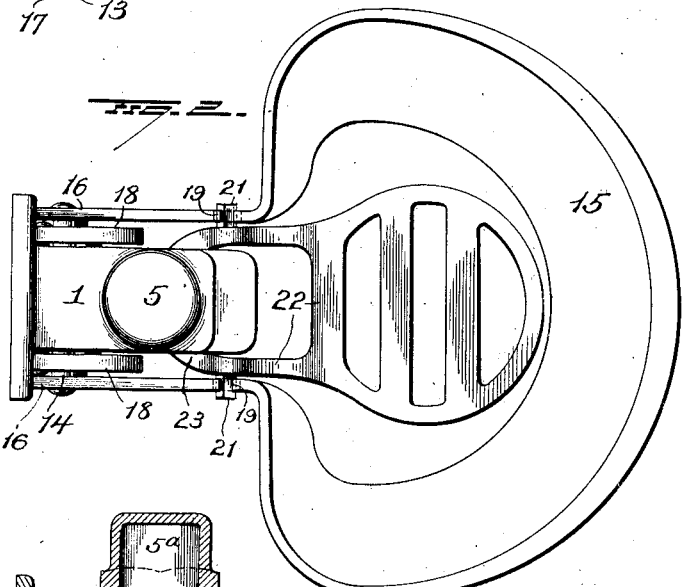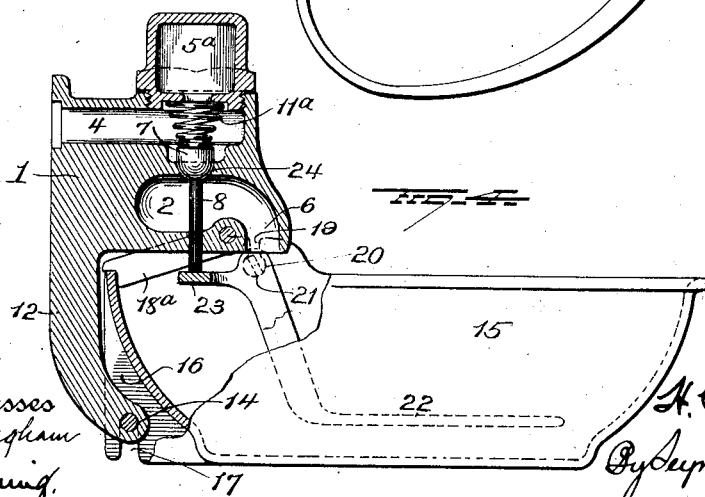

HUGO C. RASSMANN, OF BEAVER DAM, WISCONSIN.

WATERING DEVICE FOR CATTLE.

1,344,189.

Specification of Letters Patent.   Patented June 22, 1920.

Application filed November 6, 1918.   Serial No. 261,390.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—one object of the invention being to so mount an animal-controlled valve-operating lever within the bowl that said lever may be quickly and accurately placed in position or removed from the bowl, and so that the accuracy and efficiency of its normal operation shall be insured.

With these and other objects in view, the invention consists in certain novel features of construction and combinations of parts as hereinafter set forth and pointed out in the claims.

In the accompanying drawings, Figure 1 is a sectional view of a watering device showing an embodiment of my invention. Fig. 2 is a plan view. Fig. 3 is an enlarged detail view showing the pivot mounting of the lever, and Fig. 4 is a view illustrating certain modifications.

1 represents a fount having a chamber 2 therein for the accommodation of a valve cage 3,—said fount being also provided with duct or supply passage 4, with which an air dome 5 communicates for a purpose hereinafter explained. One end of the passage 4 is adapted for the reception of a suitable supply pipe (not shown) and is adapted at its other end to communicate with the valve cage 3,—said fount being also formed with a discharge spout 6 communicating with the valve cage. The spout 6 is so located as to discharge into a drinking bowl as hereinafter described.

The top of the valve cage is provided with a seat for a valve 7, the stem 8 of which passes downwardly through the cage and through the bottom 9 thereof and terminates an appreciable distance below said bottom. Intermediate of its ends, within the cage 3, the valve stem 9 is provided with a collar 10 which forms a bearing for one end of a coiled spring 11,—the other end of said spring bearing against the top portion of the cage and serving normally to retain the valve on its seat.

The fount 1 is provided with a depending arm or bracket 12, the lower end of which is formed with a toe 13 with which a pivot pin 14 is connected so as to project laterally in opposite directions therefrom. This pin serves as a pivotal support or hinge pin for a bowl 15,—said bowl being provided at one end with parallel extensions 16 which partially embrace the arm or bracket 12 and are perforated to receive the ends of the pivot pin 14. The perforations which receive said pivot are made in the form of elongated slots 17 made in the lower portions of the extensions 16 and open at their lower ends so that the bowl may be lifted off the pin 14 to remove it from its support.

The bowl 15 is retained in normal horizontal position by means of a latch 18, which, in the present instance, is made in the form of a double hook suitably braced and pivotally attached to the depending arm or bracket 12 so that it will engage the rear end portion of the bowl as shown in Fig. 1.

By mounting the bowl as above described, it may be located near the floor where it will be conveniently disposed for watering hogs, and notwithstanding its comparatively close proximity to the floor it can be readily removed without interference of the fount or its spout which are disposed above the plane of the upper edge of said bowl.

The side walls of the rear portion of the bowl are made with vertical slots 19 open at their upper ends and communicating at their lower ends with rounded or circular openings 20 in which elongated lugs 21 on an animal operated platform lever 22 have their bearings,—said lever being thus pivotally mounted in the bowl and having its platform portion disposed a short distance above the bottom of the latter. The platform lever is provided near its pivoted upper end with a rearwardly projecting arm 23 normally disposed under the downwardly projecting end of the valve stem 8. It is apparent that when the animal depresses the platform lever, the valve will be raised from its seat and water will be permitted to flow into the bowl.

It sometimes happens in watering devices of the type to which my invention relates, that when such devices are connected with high pressure water systems and the animal depresses the platform lever just slightly, the valve is liable to open and then quickly close and cause a "kicking" action to be imparted to the platform lever. Such action of the valve and the consequent kicking or vibration of the platform lever will tend to disconcert the animal when in the act of drinking. By the provision of the dome 5 communicating with the inlet duct or passage 4, an air cushion will be provided which will prevent clattering of the valve and consequent kicking or vibration of the platform lever, and thus avoid the disconcerting of the animal when in the act of drinking.

By reason of the mounting for the platform lever as hereinafter described, said lever may be quickly mounted in the bowl and will be prevented from being displaced by the animal.

In mounting the platform lever in the bowl, said lever may first be disposed in a raised position so as to cause the elongated pivot lugs 21 to aline with the slots 19 in the walls of the bowl, and then, after passing said lugs through the slots until they enter the rounded openings 20, the lever may be lowered to its normal operative position and the elongated lugs will then become mounted to turn in said openings and will be kept out of alinement with the slots 21. It is evident that by reversing these operations, the platform lever may be easily removed from the bowl when desired.

In the form of invention shown in Fig. 4, the valve cage is omitted and a seat 24 for the valve 7 is formed in the fount between the duct 4 and the chamber 2, and the dome 5ª is made separate from the fount and removably attached thereto. A spring 11ª disposed between the base of the dome 5ª and the valve 7, presses the latter against its seat. In Fig. 4, the latch 18ª is attached to the forward portion of the fount and engages the rear portion of the bowl.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. In a watering device, the combination with a valved fount, of a bowl member and an animal operated valve operating member disposed in said bowl member, one of said members having flat pivot lugs, and the other of said members having substantially circular openings receiving said flat pivot lugs and also having open slots communicating with said openings, whereby said valve operating device is removably mounted in the bowl.

2. In a watering device for cattle, the combination with a valved fount and a bowl, opposite walls of said bowl having substantially circular bearings, of an animal operated lever disposed in said bowl in operative relation to the valve of the fount, said lever having flat lugs mounted to turn in said bearings and removable therefrom to permit the ready mounting of the lever in the bowl and its removal therefrom.

3. In a watering device for cattle, the combination with a valved fount, of a bowl having slots in opposite walls thereof, said slots being open at their upper ends, said walls of the bowl also having rounded openings communicating with the lower ends of said slots, an animal-operated lever operatively associated with the valve of the fount, and elongated lugs on said lever movable through said slots and mounted to turn in said rounded openings.

In testimony whereof I have signed this specification in the presence of two subscribing witnesses.

HUGO C. RASSMANN.

Witnesses:
H. R. VETTER,
E. J. LAWRENCE.